United States Patent
Whight et al.

(10) Patent No.: US 6,611,550 B1
(45) Date of Patent: Aug. 26, 2003

(54) SPREAD SPECTRUM RECEIVER

(75) Inventors: Kenneth R. Whight, Horsham (GB); Martin L. Mee, Ashtead (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 358 days.

(21) Appl. No.: 09/717,967

(22) Filed: Nov. 21, 2000

(30) Foreign Application Priority Data

Dec. 10, 1999 (GB) .............................................. 9929132

(51) Int. Cl.[7] .......................... H04B 1/69; H04B 1/707; H04B 1/713; H04L 27/06; H04L 25/08
(52) U.S. Cl. ........................ 375/152; 375/343; 375/346
(58) Field of Search ................. 375/152, 343, 375/346

(56) References Cited

U.S. PATENT DOCUMENTS

| | | | | |
|---|---|---|---|---|
| 5,265,121 A | * | 11/1993 | Stewart ........................ | 375/346 |
| 5,416,800 A | * | 5/1995 | Frank .......................... | 375/239 |
| 5,426,670 A | * | 6/1995 | Leppanen et al. .......... | 375/343 |
| 5,448,596 A | * | 9/1995 | Ezran et al. ................. | 375/350 |
| 5,550,810 A | | 8/1996 | Monogioudis et al. ........ | 370/18 |
| 5,912,919 A | * | 6/1999 | Lomp et al. ................. | 375/208 |
| 6,014,407 A | * | 1/2000 | Hunsinger et al. .......... | 375/206 |

FOREIGN PATENT DOCUMENTS

| EP | 0820156 A2 | * | 1/1998 | ........... H04B/1/707 |
|---|---|---|---|---|
| EP | 0820156 A2 | | 1/1998 | ........... H04B/1/707 |

* cited by examiner

*Primary Examiner*—Mohammad H. Ghayour
*Assistant Examiner*—Tony Al-Beshrawi
(74) *Attorney, Agent, or Firm*—Jack D. Slobod

(57) ABSTRACT

A method of, and receiver for, recovering data bits from a spread spectrum signal, in which a digitally sampled chip sequence is derived from a received spread spectrum signal, a matched filter (34) filters the digitally sampled chip sequence in a matched filter, a circuit (36) obtains a running average of the output from the matched filter over successive bit periods, and means are provided for noting, in successive bit periods, which of the matched filter output samples corresponds to the maximum value in the running average and determines the sign of the sample in a stage of the matched filter synchronised with the maximum value and assigns a data bit value in accordance with the sign.

Figure 1:
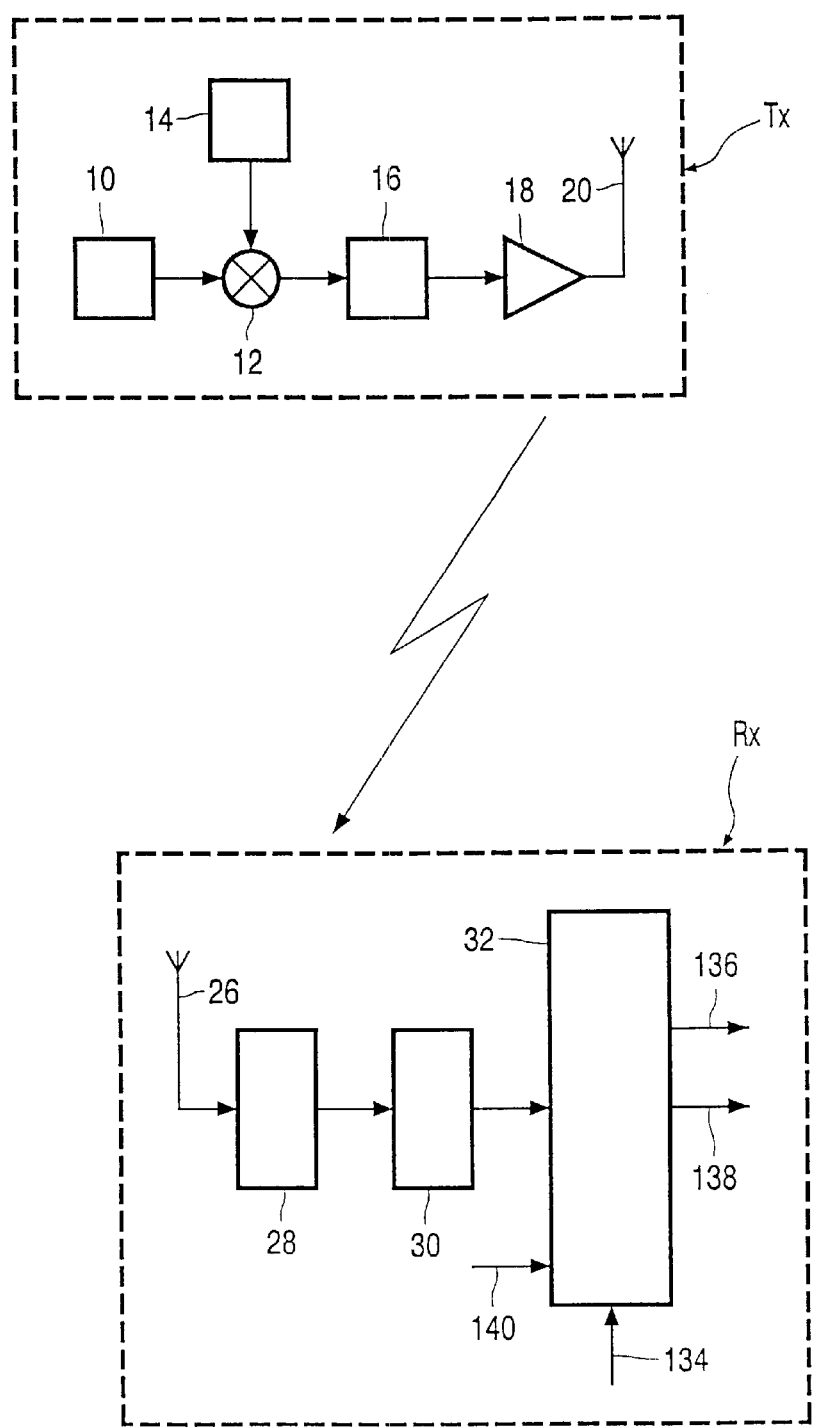

More particularly the running average is determined in accordance with the equation:

$$\hat{X}_i^n = \alpha * \hat{X}_i^{n-1} + (1-\alpha) * \hat{X}_i^n$$

where $X_i^n$ is the absolute value of the ith matched filter output sample in the n th databit period, $\hat{X}_i^{n-1}$ is the corresponding ith sample running average at the end of the n−1 th databit period, and $\alpha$ is the averaging gain and has a value between $0 \leq \alpha \leq 1$.

9 Claims, 4 Drawing Sheets

SPREAD SPECTRUM RECEIVER

The present invention relates to a spread spectrum receiver and to a method of recovering data bits from a spread spectrum signal.

Low cost low power spread spectrum radio systems are being developed for use in the home for interactive control and the passing of data between hardware units. One such system is termed Firefly (formerly known as HomeRF Lite) and it is proposed to operate this system in the 2.4 GHz ISM band with a 200 kbps bit rate spread to 2.2 MHz using an 11 chip pseudo-random sequence. GMSK has been proposed for the modulation scheme as this minimises the out of band side lobes of the transmitted signal.

The low power requirement implies that the hardware units should spend a considerable amount of time in a power saving sleep mode, only waking up occasionally to determine if a relevant signal is being transmitted. The faster the detection process the more the power consumption can be reduced. Coherent detectors which employ phase locked loops and delay locked loops, for carrier and code locking respectively, are at a disadvantage with respect to saving power due to the relatively long settling times of their loop filters.

A non-coherent method of decoding a spread spectrum signal may be implemented using a matched filter, however the resulting Bit Error Rate (BER) curve as a function of Signal to Noise Radio (SNR) can be expected to suffer a penalty when compared to a coherent receiver that is synchronised to the transmitters code sequence. Typically the penalty is a loss in effective SNR of the order of 3 dB.

An object of the present invention is to improve the performance of a non-synchronised matched filter when decoding CDMA bit sequences.

According to one aspect of the present invention there is provided a method of recovering data bits from a spread spectrum signal, comprising deriving a digitally sampled chip sequence from a received spread spectrum signal, filtering the digitally sampled chip sequence in a matched filter, obtaining a running average of the output from the matched filter over successive bit periods, noting, in successive bit periods, which of the matched filter output samples corresponds to the maximum value in the running average and determining the sign of the sample in a stage of the matched filter synchronised with the maximum value and assigning a data bit value in accordance with said sign.

According to a second aspect of the present invention there is provided a receiver for a spread spectrum signal, comprising means for receiving a spread spectrum signal and for producing an analogue chip sequence, means for digitising the analogue chip sequence to produce a digitally sampled chip sequence, a digital matched filter having an input for the digitally sampled chip sequence, means coupled to an output of the matched filter for obtaining a running average of the output of the matched filter over successive bit periods, means for noting which of the matched output samples corresponds to a maximum value in the running average in successive bit periods, and decision means for noting the sign of the signal in the filter stage synchronised with the maximum value and assigning a data bit value in accordance with said sign.

By means of the present invention a degree of synchronisation is achieved by computing the running average of the magnitude of the output of the matched filter over a number of bit periods so that the true peak output position can emerge from the noise.

In computing the running average, a new RMS value $\hat{X}_i^n$ at each sample is computed from:

$$\hat{X}_i^n = \alpha * \hat{X}_i^{n-1} + (1-\alpha) * X_i^n$$

where $X_i^n$ is the absolute value of the ith matched filter output sample in the n th data bit period, $\hat{X}_i^{n-1}$ is the corresponding ith sample running average at the end of the n−1th data bit period, and $\alpha$ is the averaging gain and has a value $0 \leq \alpha \leq 1$. Typically $\alpha = 0.5$ for a simple average and a higher value closer to 1 for a system more resistant to the effects of noise.

The synchronisation sample for the bit period is then taken as that matched filter output sample corresponding to the maximum $\hat{X}_i^n$ value. The averaging gain $\alpha$ is typically 0.5 for a simple average but a value closer to 1.0 may be chosen to effectively average the noise over a longer period thereby increasing the noise immunity.

Figure 2:
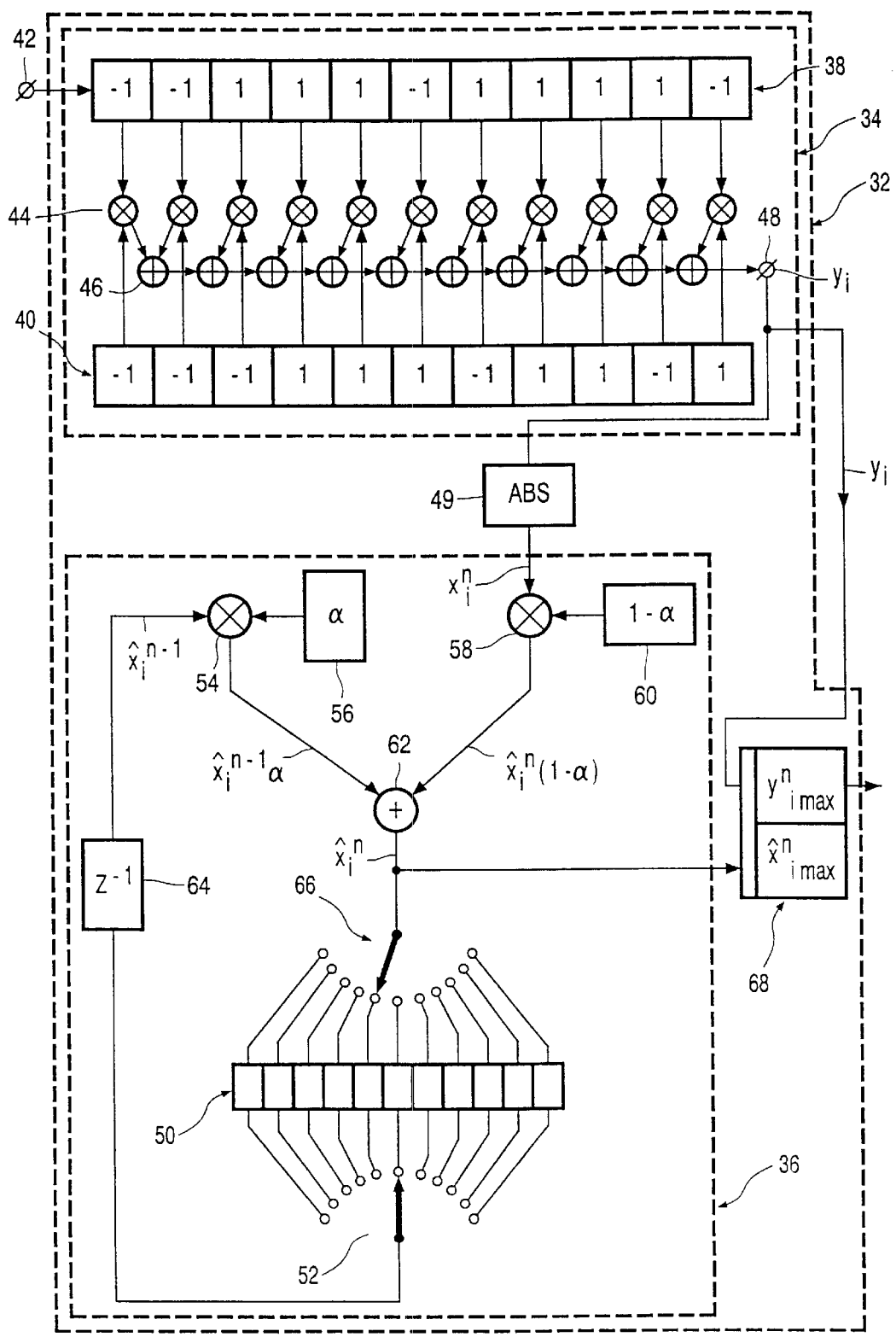
Figure 3:
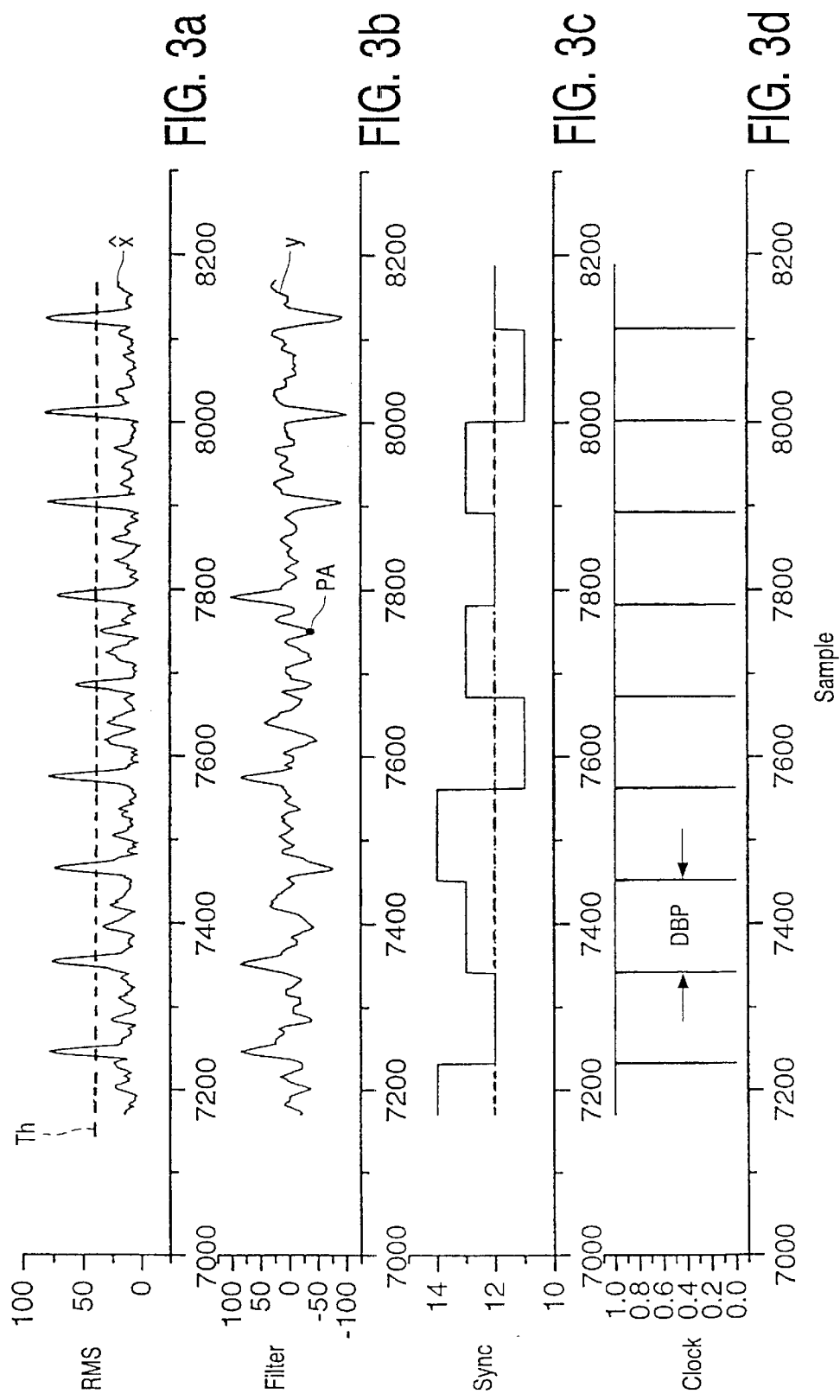
Figure 4:
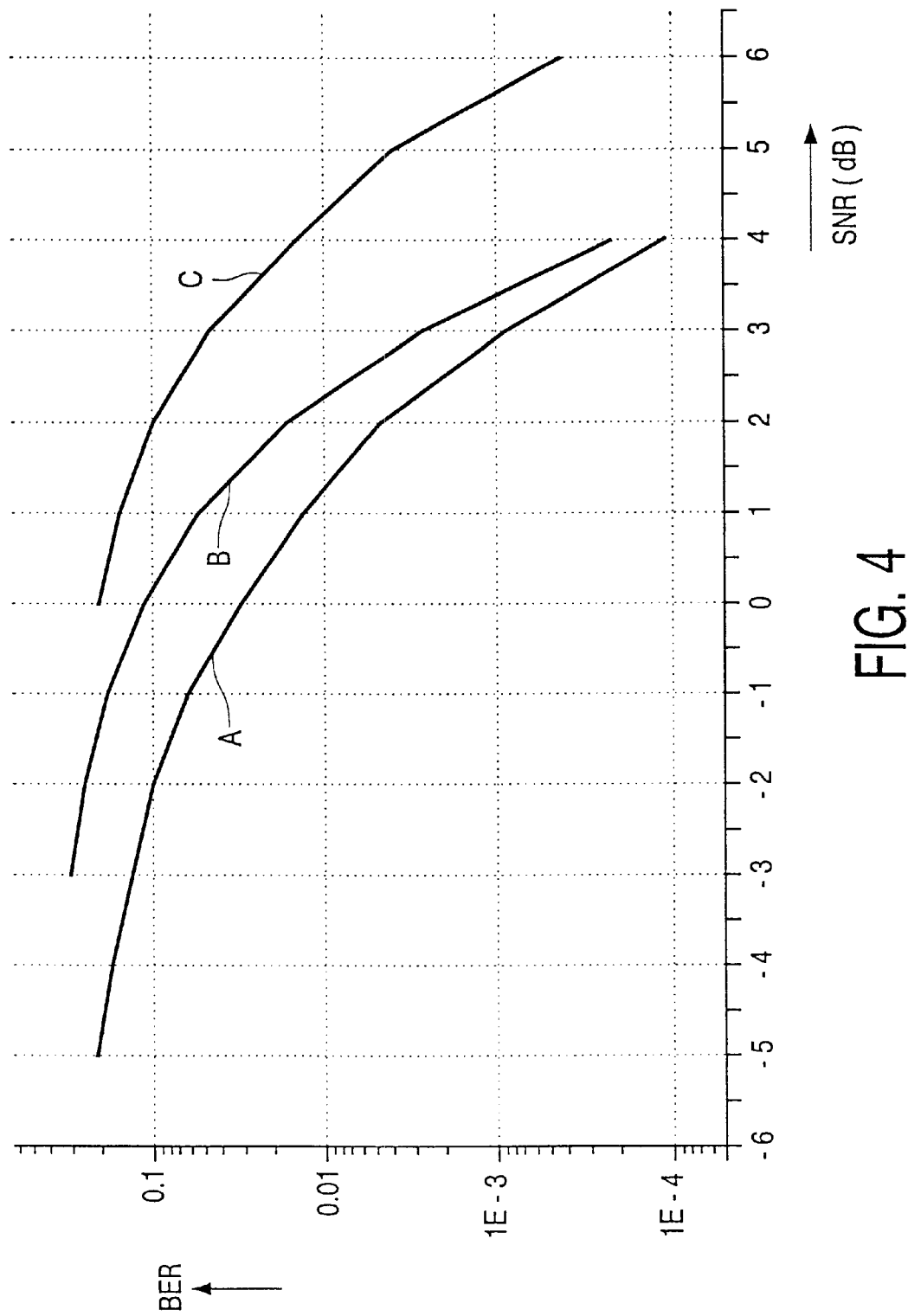

The present invention will now be described, by way of example, with reference to the accompanying drawings, wherein:

FIG. 1 is a block schematic diagram of an embodiment of a spread spectrum system, FIG. 2 is a block schematic diagram of a matched filter and a circuit for deriving a running average, FIGS. 3a, 3b, 3c and 3d respectively show the RMS output, matched filter output, estimated synchronised sample position and clock waveforms which facilitate an understanding of the operation of the circuit shown in FIG. 2, and FIG. 4 shows graphs for comparing the performances of an ideal coherent detector, a receiver made in accordance with the present invention and a non-coherent matched filter.

In the drawings the same reference numerals have been used to represent corresponding features.

Referring to FIG. 1, the spread spectrum system comprises a transmitter Tx and a receiver Rx. For convenience of description it will be assumed that the system operates in the 2.4 GHz ISM bandwith a 200 kbps bit rate spread to 2.2 MHz using an 11 chip P-N sequence. The transmitter Tx comprises a data source 10 which produces a plurality of symbols in the form of bits at 200 kbps. The symbols are supplied to a multiplier 12 to which is connected a code generator 14 which supplies an 11 chip P-N sequence. The 2.2 MHz output of the multiplier 12 is supplied to a GFSK modulator 16, the output from which is amplified in a power amplifier 18 and propagated by an antenna 20. In the course of being propagated the signal will be subject to noise.

At the receiver Rx, the propagated signal is received by an antenna 26 and is passed to a RF front end and demodulator 28. The output is supplied to a 1 bit analogue-to-digital converter 30 which supplies a 2.2 MHz (or 2.2 megachips per second) signal to a filter function block 32 to be decoded.

In the stage 32 the 2.2 MHz signal is over-sampled by say a factor of 10. The block 32 has an input 134 for a symbol clock rate signal, viz. 200 kHz, and two outputs, namely, output 136 for signal detect, which is "1" if a signal is believed to be present but otherwise it is zero and output 138 for bits out, that is, the decoded bit stream.

Another input (or inputs) 140 is (or are) provided in the block 32 for supplying (a) the P-N sequence, (b) the averaging gain alpha (or $\alpha$) which can take values in the range $0 \leq \alpha \leq 1$, and (c) the filter RMS signal threshold above which a signal is deemed to be present, given that the maximum possible RMS signal value is equal to the code length multiplied by the oversampling factor, that is 11×10= 110.

Referring to FIG. 2, the filter function block 32 includes a matched filter 34, a running average circuit 36 and a decision stage 68. The matched filter 34 comprises a shift register 38 and a register 40, each of which has 11 macro stages, each one corresponding to one of the chips in the PN-sequence. However each macro stage comprises 10 sub-stages to take into account the oversampling of the chips by a factor of 10. The oversampled chip stream is supplied to an input 42 of the shift register 38. The PN-sequence is permanently stored in the register 40 with each of the 10 sub-stages of a macro stage storing the same value and sign. Corresponding sub-stages of each register 38, 40 are connected to a respective XOR gate 44, the outputs from all the XOR gates are combined in a sequence of adding stages 46 to provide combined filter output signal $y_i$ on a terminal 48.

In operation the shift register 38 is clocked at the oversampled chip rate, viz. 22 MHz, and after each advance of the shift register 38 the XOR and addition operations are performed to yield a filter output at the oversampled chip rate. Because of the autocorrelation properties of the useful PN-code sequences, the filter output on the terminal 48 will peak within a bit period, in the absence of noise, at the instant when the local code sequence in the register 40 is synchronised with the received code sequence and the sign of the peak will correspond to the sign of the transmitted bit. However in the presence of noise, spurious peaks in the filter output can result in erroneous bit determinations as the amplitude of the true, synchronised, peak can be reduced whilst the filter output signal can peak at other times within a bit period.

The running average circuit 36 enables synchronisation to be achieved by computing the running average of a RMS filter to allow the true signal to emerge from the noise. The computation is summarised by the following equation:

$$\hat{X}_i^n + \alpha * \hat{X}_i^{n-1} + (1-\alpha)*X_i^n$$

where $X_i^n$ is the absolute value of the ith matched filter output sample in the n th data bit period, $\hat{X}_i^{n-1}$ is the corresponding ith sample running average at the end of the n-1th data bit period, and $\alpha$ is the averaging gain and has a value $0 \leq \alpha \leq 1$. Typically $\alpha=0.5$ for a simple average and a higher value closer to 1 for a system more resistant to the effects of noise.

An implementation of the circuit 36 comprises a multi-stage store 50 for storing at each location or register the current running average of each sample of the oversampled chips. Each register of the store 50 is coupled to a demultiplexing arrangement 52 so that each sample stored can be read-out in succession and applied by way of a delay element 64 having a delay of one sample period to a calculating network. The calculating network, which processes the previous sample which has been delayed by the delay element 64, includes a first multiplier 54 in which the sample $\hat{X}_i^{n-1}$ is multiplied by $\alpha$ which is held in a store 56 to produce $\alpha*\hat{X}_i^{n-1}$. The corresponding output $y_i$ on the terminal 48 is applied to an absolute value stage 49 which provides a corresponding output $X_i^n$, where $X_i^n$=abs $y_i^n$, which is applied to a second multiplier 58 and is multiplied by $(1-\alpha)$ held in a store 60 to produce $(1-\alpha)$ $X_i^n$. The outputs produced by the first and second multipliers 54, 58 are combined in a summation stage 62 to produce the new running average $\hat{X}_i^n$ which is applied to a multiplexer 66 which is connected to the register of the store 50 immediately prior to the register from which the previous corresponding running average value was read-out and the new value is stored.

During successive bit period, a process is implemented to find the maximum value of $\hat{X}_i^n$. At the beginning of a bit period the value stored in the first location is treated as a maximum $X_{i\,max}^n$ and the next following value $\hat{X}_i^n$ is compared in a comparison stage 68 with the first one and, if it is larger, it becomes the new maximum and simultaneously the corresponding matched filter output sample value is stored. This process is continued and by the end of the bit period it is known which sample in the shift register 38 corresponds to the maximum $y_{i\,max}^n$ and its sign (positive or negative) is used to make a hard decision on the bit value. If it is desired to make a soft decision the value $\hat{y}_{i\,max}^n$ at the end of the bit period is used. Whilst it is necessary to store all the values of $\hat{X}_{i\,max}^n$ for the next databit, it is not necessary to store all the samples $X_i^n$. All that it is required to store during a given bit period are the value of the current maximum of the $\hat{X}_i^n$ and the corresponding value of the filter output $y_{i\,max}^n$. The decision made on $y_{i\,max}^n$ within the stage 68 is the output.

Referring to FIGS. 3a to 3d, the abscissa represents the sample numbers. FIG. 3d represents an unsynchronised clock signal at the bit frequency and shows the data bit periods DBP. FIG. 3b shows the noisy matched filter raw output y the terminal 48 (FIG. 2). FIG. 3a shows the running average $\hat{X}$ output. Finally FIG. 3c shows the synchronisation sample derived from the peak position relative to the clock pulse of the $\hat{X}$ trace shown in FIG. 3a. Looking in detail at these figures, it will be noted in FIG. 3b that in the data bit period around the sample 7700, the peak amplitude PA has moved, because of noise, to the wrong position in the data bit period which could result in a bit error unless corrected by the method in accordance with the present invention. However, by obtaining the running average and identifying the maximum value, the effects of noise are reduced and a clear peak is obtained close to the correct position indicated by the broken line at sync level 12 (FIG. 3c).

More particularly in order to detect the peaks in the RMS or running average trace, a threshold level Th (FIG. 3a) is set above the noise floor and if the peaks are above the threshold, the user knows that it is a good signal, and if the peaks are below the threshold the user knows that the signal is erroneous due to the presence of noise. The choice of the threshold level Th is made having regard to what bit error rate is acceptable.

FIG. 4 compares the performances of (1) an ideal synchronised matched filter trace A, in which an output is provided at the true instant that the received signal correlates with the given P-N sequence regardless of noise level, (2) an unsynchronised matched filter, trace C, in which spurious peaks due to the presence of noise can result in erroneous bit determinations, and (3) a synchronised matched filter, trace B, in which by obtaining a running average and selecting a maximum in each bit period a degree of synchronisation to the transmitted code is achieved thus yielding an improvement of the order of 3 dB in the BER curve.

When implementing the running average circuit 36 the total number of storage registers in the store 50 equals the number of chips per databit (viz. 11) multiplied by the chip oversampling rate (viz 10), that is 11×10=registers. If the number of registers is excessive in silicon area, various options are available to reduce the number of registers. One option is to average over chip periods which will require 11 storage registers in the present example and then focussing on the chip period that contains the peak, this will require a further 10 registers to take into account the chip oversample factor. Another option is to reduce the oversampling rate to 5 which will require 55 locations in the store 50. A further option is to use a binary tree hierarchy to minimise the number of registers. However a disadvantage of reducing the number of registers is to increase the lock-on time.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of spread spectrum receivers and component parts therefor and which may be used instead of or in addition to features already described herein.

What is claimed is:

1. A method of recovering data bits from a spread spectrum signal, the method comprising:
    deriving a digitally sampled chip sequence from a received spread spectrum signal;
    filtering the digitally sampled chip sequence in a matched filter;
    obtaining a running average of the output from the matched filter over successive bit periods, noting, in successive bit periods, which of the matched filter output samples corresponds to the maximum value in the running average;
    determining a sign of the sample in a stage of the matched filter synchronized with the maximum value; and
    assigning a data bit value in accordance with said sign.

2. The method as claimed in claim 1, wherein the digitally sampled bit stream is oversampled the samples are applied to the matched filter and a running average of the corresponding current sample and its previous running average are obtained.

3. A The method as claimed in claim 1 wherein the running average is determined in accordance with an equation:

$$\hat{X}_i^n = \alpha * \hat{X}_i^{n-1} + (1-\alpha) * X_i^n$$

where $X_i^n$ is an absolute value of the an i th matched filter output sample in an n th data bit period,
$\hat{X}_i^{n-1}$ is a corresponding i th sample running average at an end of an n−1 th data bit period, and
$\alpha$ is an averaging gain and has a value between $0 \leq \alpha \leq 1$.

4. The method as claimed in claim 3, wherein the value of $\alpha$ is selected in accordance with an ambient noise and a desired synchronization response time of the matched filter.

5. A receiver for a spread spectrum signal, said receiver comprising:
    means for receiving a spread spectrum signal and for producing an analogue chip sequence;
    means for digitizing the analogue chip sequence to produce a digitally sampled chip sequencer;
    a digital matched filter having an input for the digitally sampled chip sequence;
    means coupled to an output of the matched filter for obtaining a running average of the output of the matched filter over successive bit periods;
    means for noting which of the matched output samples corresponds to a maximum value in the running average in successive bit periods; and
    decision means for noting a sign of the signal in the filter stage synchronized with the maximum value and assigning a data bit value in accordance with said sign.

6. The receiver as claimed in claim 5, further comprising:
    means for oversampling the digitally sampled bit stream and applying the samples to the matched filter; and
    means for obtaining a running average of the corresponding current sample and its previous running average.

7. The receiver as claimed in claim 5 wherein said means for obtaining the running average is constructed to implement the equation:

$$\hat{X}_i^n = \alpha * \hat{X}_i^{n-1} + (1-\alpha) * X_i^n$$

where $X_i^n$ is an absolute value of an i th matched filter output sample in an n th data bit period,
$\hat{X}_i^{n-1}$ is a corresponding i th sample running average at an end of an n−1 th data bit period, and
$\alpha$ is an averaging gain and has a value between $0 \leq \alpha \leq 1$.

8. A method of recovering data bits from a spread spectrum signal, the method comprising:
    deriving a digitally sampled chip sequence from a received spread spectrum signal;
    filtering the digitally sampled chip sequence in a matched filter; and
    obtaining a running average in accordance with the equation:

$$\hat{X}_i^n = \alpha * \hat{X}_i^{n-1} + (1-\alpha) * X_i^n$$

where is $X_i^n$ an absolute value of an i th matched filter output sample in an n th data bit period,
$\hat{X}_i^{n-1}$ is a corresponding i th sample running average at an end of an n−1 th data bit period, and
$\alpha$ is an averaging gain and has a value between $0 \leq \alpha \leq 1$.

9. The method as claimed in claim 8, wherein the value of $\alpha$ is selected in accordance with an ambient noise and a desired synchronization response time of the matched filter.

* * * * *